United States Patent Office

3,132,947
Patented May 12, 1964

---

3,132,947
METHOD OF PRODUCING AROMATIZED
COFFEE EXTRACT
James P. Mahlmann, Fair Lawn, N.J., assignor to General
Foods Corporation, White Plains, N.Y., a corporation
of Delaware
No Drawing. Filed Mar. 14, 1963, Ser. No. 265,033
17 Claims. (Cl. 99—71)

This invention relates to a process for preparing water soluble coffee extracts and more particularly to the enhancement of dried soluble coffee extract to provide such extract with desirable cup flavor and aroma qualities.

The development of present day soluble coffee concentrates has given rise to a need for a dried water soluble extract of roasted coffee having a high quality cup flavor comparable to that found in brewed or percolated coffee. However, dried extracts of roasted coffee are notably deficient in flavor values found in brewed coffee due to the necessity for aqueous extraction of the roasted coffee particles and subsequent drying of the aqueous extract to a powder wherein a considerable portion of flavor volatiles is lost. Various methods have been employed in an effort to restore or replace the coffee flavor values lost in such treatment. One such technique involves the steam treatment of wet roasted coffee to separate and remove the volatile aromatic flavors prior to extraction and dehydration of the aqueous extract. The separated flavor volatiles are treated with an alkaline material to neutralize the acids released in the steaming operation. After treatment with a hydrocarbon solvent to separate the organic flavor materials from excess water, the organic solvent is removed. The flavor materials are then combined with a concentrated non-aromatic extract and spray dried to a powder. However, with the use of such a process the isolation of the aromatic flavor volatiles poses a stability problem in the presence of co-released acids and moisture. These acids must be either separated out or neutralized. With the removal of deterious acids by neutralization a detrimental effect is noted in the cup flavor of the coffee obtained. It appears that a certain quantity of natural coffee acids are necessary for balanced cup flavor. On the other hand addition of such acids from an outside source to compensate for the natural coffee acids removed by neutralization results in a tart cup flavor.

When hydrocarbon solvents are employed to induce the separation of aromatic flavor volatiles from co-distilled water and acids, a large portion of the aroma fraction itself is lost in the removal of the hydrocarbon fluid. In addition, such treatments are costly, time consuming, and cumbersome in terms of the necessary plant operations involved. Such treatment also lowers the quality of the final dried extract produced because of the presence of residual quantities of the extracting hydrocarbon liquid which remain in the system.

It would be most desirable to provide a simple and direct method of separating out a maximum amount of the volatile coffee flavor constituents contained in roasted coffee. It would be also desirable to remove such volatile flavors free of excessive deleterious acids and moisture. It would be an advance in the art of aromatizing dried coffee extract to supply a method of release of such volatiles which avoids a plurality of costly steps for removal of degrading excess acids and moisture from the aromatic flavor condensate.

It is an object of the present invention to provide a process for maximum recovery of aromatic flavor components released by steam treatment of roasted coffee and retention of those components.

It is a more specific object of this invention to set forth a simple technique for removal of coffee aroma volatiles from roasted coffee which do not contain excessive amounts of coffee acids.

It has now been discovered that the objects of this invention can be met by introducing steam at the lower extremity of an elongated column containing a packed bed of roasted and ground coffee particles having a particle size whereat at least 90% of said particles are retained on a 40 mesh U.S. Standard Sieve screen. The bed of coffee has a length of at least five times its width and a void space between the coffee particles which is sufficient to permit an internal reflux and rectification of steam distilled volatile coffee constituents along the tortuous paths between the particles whereby the steam condenses on and wets the coffee particles and generates and extracts said volatile coffee constituents from the coffee. The supply of steam is continued to the bed of coffee particles to initiate and maintain reflux and rectification conditions until all of the coffee particles have been wetted by steam and the reflux and rectification interface has reached the top of the bed of coffee particles. A quantity of co-distilled volatile organic acids are thereby separated from the desired volatile constituents, and the desired volatile constituents are condensed. Thereafter, water soluble solids are extracted and removed from the coffee particles. The condensed volatile constituents are then combined with the extract containing the water soluble solids to produce a highly flavorful water soluble coffee product.

This invention includes: steam treatment of freshly roasted and ground coffee to increase the moisture content and temperature thereof and thereby develop and separate therefrom useful volatile aromatic flavors; aqueous extraction of soluble coffee solids from the coffee residuum to form a liquid extract; stabilization and addition back of the aromatic flavor constituents to the liquid extract; and drying of the enhanced extract to a powder. By means of this process, a simple direct method of obtaining a highly aromatized and permanently flavorable dried coffee extract is provided.

In carrying out the present invention a stable, volatilized coffee extract containing a greatly diminished amount of degrading acidic components is obtained by the steam treatment of roasted and ground coffee under conditions which effect an internal reflux and rectification of the co-distilled mixture of steam, acids, and volatile flavors. Under these conditions, where in the moisture content of the coffee particles is substantially increased as well as the temperature thereof, a unique and useful volatile flavoring material, condensable at only moderately reduced temperatures is developed and isolated from the coffee particles. The present process involves a condensation and revaporization of the coffee flavor volatiles released by steam treatment of a mass of roasted and ground coffee particles, typically of a size range wherein at least 90 percent of the particles in the grind are retained on a 40 mesh screen, and preferably a 20 mesh screen, as measured by the U.S. Standard Sieve Series Method. Treatment is made in a sufficiently elongated vessel to achieve development and rectification of the flavor volatiles and a separation and depletion of co-distilled organic acids. As a result of the present invention, removal and development of steam volatile flavors is achieved without the occurrence of channeling or uneven treatment of the roasted coffee due to accumulation of moisture in peripheral segments of the bed which will cause coffee particles to coalesce and swell thus blocking the free passage of steam and interfering with the desired removal of volatile aromatic flavors.

Thus, it has been found that by introducing saturated steam at a controlled rate so as to initiate steam distillation of flavor volatiles from a relatively coarse grind of roasted coffee in a packed column sufficiently elongated to induce an internal reflux to occur as a result of condensation on the surfaces of the particles in the column, the above objects are achieved and a substantially stable aromatic flavor condensate is obtained, i.e., one which maintains its desirable aroma and flavor in the course of being collected and added to percolator extracts and which retains its stability in a powderous soluble coffee product. The column may be of any shape; however, a cylindrical packed column having a length dimension which is at least five times its cross sectional diameter is preferred, and a column having a length dimension which is five to twenty times its cross sectional diameter is most preferred. By reason of the void spaces presented by the large uneven coarse coffee particles which form a tortuous path for the ascending vapors and equally important, the transfer of latent heat from the hot ascending vapors to the relatively cold coffee particles, a condensate of steam forms on the large surfaces of the coffee particles and the particles become wetted thereby. If desired, but not necessarily under all conditions, the walls of the column may also be cooled to further aid in internal column condensation of vapors contacting their surfaces. Preferably also the ground coffee particles are charged to the column chamber initially in a cool ambient room temperature, say below 80° F., or once charged are allowed to cool in the chamber; as a result inducement of internal refluxing and rectification is assured.

As a result of condensation on the coffee particles, volatile coffee flavor components are generated in and dissolved and diffused from the coffee particles. Entering steam then revaporizes the aqueous mixture of said aromatic flavors and sweeps the same upward in the column. As a consequence of the loss of heat of the ascending vapors to the surfaces of the relatively cooler mass of coffee particles, the elongation of the column, and the void spaces in the packed column which present a relatively free and uninterrupted passage for volatiles upward and condensate downward an internal reflux and rectification of the volatiles results. This rectification effects a concurrent enrichment of the ascending vapors of highly volatile aromatics and decrease of the less volatile higher boiling acids.

As distinguished from steaming of roasted coffee having a much smaller particle size, exhibiting a greater total surface area but subject to channeling effects in the bed resulting in an incomplete steam treatment of the entire bed, the present process involves coffee particles having a lower surface area and a column packing involving a much higher void volume. In this connection, it is a preferred feature of this invention that the coarse grind of roasted coffee has such a particle size distribution wherein 90% of the grind will be retained on a 20 mesh screen. Also, it is within the spirit of this invention that any means of providing a plurality of free paths in the bed of coffee may be practiced; e.g., pelletizing fine coffee particles in the manner disclosed in U.S. Patent No. 2,931,727, issued April 5, 1960, to Theodore Kraut. Also, whole roasted coffee beans which have been crushed to break the cell structure thereof and facilitate generation and recovery of aromatics may be used.

The aromatic flavor volatiles possessing a higher vapor pressure than the acids rise freely through the column until they contact the refluxing condensate. They are then cooled and enrich the condensate. As a result of the liquid vapor phase contact, the condensed vapor from the superposed area of the elongated packed column passing downwardly in counter-current contact with the ascending vapors tends to cool the rising vapors. During this process the descending condensate is also vaporized to achieve as an end result an overall enrichment of the volatile aromatic components which are finally vaporized and are then vented from the top of the column. The rising acid vapors passing upwardly through the column, having a lower vapor pressure when condensed, tend to remain in the column and their presence in the volatilized flavor is thereby significantly reduced. There is thus achieved a separation in the percolator column of the relatively highly volatile flavor aromatics in an enriched condensate of volatile flavors while the less volatile acid vapors which are continually being liquefied and vaporized tend to accumulate and build up a concentration of acid vapors in the column.

Generally, the roasted and ground coffee particles, which have an initial moisture content of about 3 to 7%, increase in moisture content and temperature during the volatile flavor preparation procedure until the particles have achieved a moisture content of 15 to 25% and a temperature in the neighborhood of at least 180° F. at the end of the volatilization cycle. Preferably, the roasted and ground coffee particles throughout the depth of the bed will be elevated to a temperature above 190° F. but not greater than 230° F. although temperatures as high as 280° F. may be tolerated in the bottom portions of the bed. The temperature in the vicinity of the vapor product exiting from the bed will be above 212° F. Generally, for commercial columns of a height of about 10–25 feet the saturated steam will be applied at pressures of 5–40 p.s.i.g. (as measured on the inlet port of the column containing the bed of roasted and ground coffee). At these pressures a satisfactory reflux and rectification will be achieved and the temperature of the exiting vapors will not be above 230° F. and preferably below 220° F. It will be understood, of course, that the bottom portion of the elongated bed of coffee (adjacent the inlet port for the steam) will have a higher temperature than the upper portions of the bed and that, therefore, temperatures above 230° F. may be experienced at the bottom of the bed while still providing exit vapors of below 230° F. and preferably 212°–220° F. at the top of the column. Regardless of the size or height of the bed of coffee, the steam should be admitted at a rate and pressure which is sufficiently slow to distill volatile constituents therefrom. In the case of an elongated short column having a relatively low pressure drop therethrough (as in laboratory or pilot plant equipment), steam is introduced to the bottom of the column at a steam pressure in the neighborhood of 0.5–10 p.s.i.g.

In carrying out a preferred embodiment of the present invention, steam is passed through the elongated bed of roasted and ground coffee for a period of at least 15 minutes, preferably 15–45 minutes, and most preferably 20–30 minutes before a sufficient quantity of volatile vapors is generated and condensate begins to collect at a condensation temperature of 35°–70° F. Steaming is continued until 1–8 ml., preferably 1–6 ml., of the liquid condensate is collected for each pound of coffee treated.

As indicated, the steam volatilized flavor values used in accordance with the present invention can be collected by condensation at only moderately reduced temperatures of 35°–70° F. and preferably 40° to 60° F., although more difficultly condensable aromatic material may also be recovered and be used in combination with the desired volatile flavor by employing colder condenser temperatures ranging from below 35° F. to the temperature of liquid nitrogen, i.e., about −320° F. However, the desired flavor fraction has been found to be collectible simply by using cold water or some other less stringent temperature-reducing heat transfer medium and substantially normal atmospheric pressure. The condensation product so achieved will be in the form of a relatively stable emulsion for a period of approximately 24 hours whereupon it will separate slowly into three distinct phases, to wit: (i) a minor light water-immiscible phase, (ii) a major watery phase therebeneath, and (iii) a minor heavy water-immiscible phase beneath the watery phase. The condensate is preferably used shortly after its collection, say in a matter of less than 30 minutes. The condensate may be incorporated into a typical roasted coffee percolate having a water soluble solids content of 20 to 35% or into a coffee extract which may be concentrated prior to combination with the condensate. By virtue of the internal reflux and rectification and the depletion of volatile acids condensed in the steam volatilized flavor, a more stable condensate is produced which retains flavorful aromatic values.

According to another embodiment of the present invention, the desirable steam volatile flavor may be further stabilized by passing the coffee vapors through an elongated packed fractionator column. Undesirable condensed volatile organic acids and water which are co-currently volatilized during steam treatment are removed from the bottom of the fractionator column and the desirable steam volatile coffee flavors are removed from the top of the column and are condensed to obtain a stabilized volatile flavor condensate which will separate slowly upon standing.

It has been found that a fractionated steam volatilized flavor obtained in the manner disclosed herein exhibits superior properties of flavor stability when plated on or added to a dried powder or concentrated aqueous extract of roasted coffee either alone or in combination with coffee oil.

The present separation is to be distinguished from internal reflux and rectification of steam release coffee volatiles in the percolating column to remove aciduous vapors in that by means of the separate fractionator column the liquid flavor condensate is in addition to being stabilized by removal of acids also concentrated by removal of water which is removed with the liquid "bottoms" from the fractionator column. Moreover, in view of the inert nature of the entire bed of packing material employed, a more complete removal of undesirable volatile components including those generated from coffee particles located in the uppermost portion of the percolating column is also effected in the fractionator.

The fractionating column employed to distill the vaporous flavor-acids mixture is of the packed type. The packing material preferably employed is half-inch glass rings although any packing material such as Teflon or tetrafluoroethylene or Inconel which is an alloy comprising aluminum, copper, and other metals are also satisfactory. The distinguishing characteristic of the packing material employed is that it possess a substantially non-porous surface and is non-reactive in the sense that it is chemically inert to either acidic or alkaline materials passing through the column. The preferred packing material is in the shape of cylindrical half-inch sections resembling pieces of sectioned glass tubing although any shaped inert packing material which will exhibit sufficient surface irregularity to permit free flow of ascending vapors upward and descending condensate downward by the creation of a large number of void spaces between the surfaces of the packing is considered suitable for use in our process. The important criteria of the packing material is that it be inert and exhibit irregularity sufficient to induce internal column reflux. It must also be of uniform size and shape throughout the column to avoid blocking of the upward flow of vapors and downward flow of liquid at any point in the column, resulting in a channeling effect. Channeling as commonly understood in distillation chemistry is referred to here as uneven particle size distribution in the packed column resulting in blocking of flow in the areas of the column having greater particle density.

Fractional distillation occurring in the fractionator column may be conceived of in terms of a continuous series of phases. The primary phase is one of contact and wetting of the relatively large cold packing rings as a result of which a heat exchange occurs. The packing rings are wetted and heated and refluxing commences. A secondary phase which overlaps the primary phase is one in which the vapor passing upward is composed of aromatic volatiles and residual steam carried over from the percolator and some organic acid vapors. The recondensation and revaporization continuously occurring as the vapors pass upward in the column cause a continuous reflux and rectification to be initiated which results in a concentrated volatile flavor "tops" coming over the top of the fractionator and the less volatile condensate of water and acids collecting at the bottom from which they are removed.

The dimensions of the fractionating column are important and it is constructed to have dimensions which will permit the requisite fractional distillation to take place. While many types of fractionator may be employed it is preferred if optimum results are desired, to employ a column at least 5 times and preferably 5 to 20 times greater in its length than in its greatest cross-sectional measurement. The most preferred dimensions of the column are 15 to 20 feet in length and a cross-sectional measurement between 10 and 20 inches. The shape of the column is preferably cylindrical although a square or rectangular column would also be operable. The walls of the column are cooled to temperatures in the order of 50°–60° F. by means of pre-cooling with a coolant liquid such as water or by provision of any suitable indirect heat exchange means about the fractionator sufficient to initially cool the walls and contents of the fractionator to the temperature indicated. The fractionator is preferably of glass construction although any material which is inert and non-porous may be employed.

Following the separation of the volatile aromatic flavors from the steaming column, the de-aromatized coffee particles remaining in the column may be subjected to a vacuum of about 15 inches of mercury. This will remove the concentration of acidic vapor and acidic vapor condensate built up in the column if they are present in undesirable amounts and permit increase of the pH of the coffee extract subsequently removed from about pH 4.7 to about pH 4.9.

The non-volatile soluble coffee solids are removed from the roasted coffee by conventional extraction methods and ultimately admixed directly with the aromatic condensate. In order to produce a high concentration of coffee solids which allows economical drying costs and flavor retention of desirable flavor value, the coffee residuum is preferably extracted with a percolate from previous extractions.

The present process may be conceived of in terms of a continuous series of phases. The first phase is one of steam contact and wetting of the large coffee particles as a result of the heat exchange between the hot saturated input steam and the relatively cool particles wherein refluxing commences. A second phase which overlaps the first phase and is superadjacent to it and one in which the vapor passing upward is composed of a mixed vapor of steam, released aromatic vapors and some organic acid vapors. The recondensation of the mixed vapors causes a continuous internal reflux to be initiated which may be considered to act as a barrier which permits selective passage of the relatively more volatile aromatic components but inhibits upward flow of the less volatile acidic acid vapors. As a consequence the fugitive aromatic vapors freely pass upward and out of the column. The organic acid components, however, are revaporized and recondensed resulting in a buildup of such acids and vapors in the column.

It appears that dehydration of droplets of coffee extract containing the volatilized flavor from a water soluble product solids content of 25 to as high as 65% more effectively stabilizes the flavor and aroma values against staling. In all of the embodiments of the invention, one of the advantages involved in separation of the aromatic portion and subsequent incorporation into the relatively non-aromatic aqueous extract is the reduction in the occurrence of side reactions which result in degraded flavor when the volatile flavor condensates are permitted to contact excessive amounts of co-distilled organic acids.

In the manner of our invention, the reflux and rectification taking place in the elongated packed column proceeds until all the coffee particles have been wetted and the reflux and rectification interface has reached the top of the column and yields an aroma condensate greatly enriched in the low boiling aromatic flavor components. As the volatile flavor condensate descends through the reflux zone and is continually vaporized and condensed it is progressively enriched with the low boiling constituents and depleted of the higher boiling organic acids. The steaming column design and packing becomes in effect a means for bringing the liquid and vapor phases into such intimate contact that the hot vapor stream tends to vaporize the low boiling flavor constituents from downward flowing liquids which have removed a mixture of high and low boiling materials from the roasted coffee. Simultaneously, the downward flowing liquid stream aids in condensing the ascending vapor which is composed of a mixture of the desirable low boiling point flavor aromatics and high boiling point organic acids. The resulting vapor passing out of the top of the column is thus found to be enriched in low boiling point vapors such as coffee flavor aromatics and relatively deficient in high boiling acids such as acetic acid and thus much less susceptible to degradation. Throughout the foregoing process the steam is supplied continually at a rate sufficient to initiate and maintain the foregoing internal reflux and rectification in the bed of coffee and accordingly is supplied at a point near the lower extremity of the column whereabove the length to width dimension exceeds 5:1 and is preferably 5:1 to 20:1; pressure in the void spaces at the top of the extraction column being just sufficient to permit transfer thereof to the condenser.

In addition to a process involving a plating of a steam volatile flavor condensate on a non-volatile base extract the present invention also comprehends co-drying of the non-aromatic liquid extract and steam volatile flavor condensate. As an alternative, the invention also includes the addition of the condensate to coffee oil, preferably in a mixture of two parts of the fractionated liquid with one part of a five-fold concentrated oil, such as described in U.S. 2,947,634 to Feldman et al., although the relative amounts of coffee oil and fractionated coffee flavor will vary widely as the particular aroma strength desired.

This invention will now be described by reference to the following specific examples:

*Example I*

About 1400 pounds of green coffee was introduced into a roaster of the type conventionally employed in the coffee industry. The coffee was roasted for about 18 minutes to a terminal roast temperature of 415° F. to yield approximately 1250 pounds of roasted coffee beans which are then ground to a particle size range whereat 95% remained on a No. 20 U.S. Standard Sieve Mesh Screen and 5% remained on a No. 8 U.S. Standard Sieve Mesh Screen. Approximately 1800 gms. of this ground coffee was then introduced to fill a glass extraction column 36 inches high, 4 inches inner diameter. Steam at between 0.5–0.75 p.s.i.g. was introduced at the bottom of the column and the steam pressure maintained at input within this range throughout the steam flavor volatilization cycle, which lasted approximately 30 minutes. During this cycle approximately 400 gms. of steam was supplied to the column. The input steam entered at the bottom of the column and passed upwardly motivated by the input steam pressure through the void space in the column. As the steam passed upwardly in the column it first wetted the coffee particles by condensation and imparted sufficient heat thereto to elevate the temperature of the coffee bed. This process continued upwardly through the height of coffee in the column while condensed steam was absorbed by the coffee particles throughout the cycle and throughout the height of the bed of coffee. The condensed steam and absorbed moisture generated and released aromatic flavor materials in the form of volatile constituents. Some of the volatiles condensed on the coffee particles and subsequent quantities of steam revaporized condensed liquid on the surface of such particles, which vaporized liquid became a mixture of condensed water vapor, aromatic constituents and organic acids. These vapors were driven upwardly through the column wherein they were contacted by descending condensed vapors which formed on the large particles of the superposed portion of the bed and the cooler non-insulated walls of the steaming column. As the steam and volatiles passed upwardly through the column no channeling was observed to occur in the bed in spite of the fact of the condensation on the walls of the vessel and on the particles in the superposed portion. The absence of channeling was attributed to the size of the particles in the coffee mass which permitted sufficient void space for free passage of condensate downward and vapors upward. The condensate which passed downwardly and counter-current to the volatiles operated to rectify the volatile materials which passed out of the top of the column and into a single vertical tube condenser which had a surface area of about 54 square inches. The condenser was cooled by tap water which was passed through ice baths to give a water temperature of 40°–50° F. The aromatic volatiles were collected at 40°–50° F. and at substantially normal atmospheric pressure.

As the steaming flavor volatilization proceeded, some slight amount of free watery liquid collected at the bottom of the column, usually less than 1% by weight of the roasted and ground coffee charge. Also, a gaseous, greenish ring of desired volatiles developed above the top of the roasted and ground coffee bed in 25 to 28 minutes. The constituents in this ring contained the essential or major fraction of use in flavoring coffee extract. These gaseous materials were eventually collected in the condenser.

The bed of roasted and ground coffee had an average moisture content at the end of the cycle of about 20% by weight of the total coffee. At the end of the cycle, the temperature in the region of the vapor products exiting from the top of the column was in the neighborhood of 215° F. During the flavor volatilization cycle approximately 8 ml. of volatiles per pound of coffee treated was condensed.

The liquid condensate was composed of an emulsion which separated on standing into three phases: (i) a water-immiscible minor phase, (ii) a watery phase which separates from the first phase, and (iii) a minor heavy immiscible liquid. The mixture had a pH of 5.1.

Following the removal of the volatile constituents, the roasted coffee particles were subjected to vacuum treatment by the application of a vacuum line pulling at least 15 inches of mercury which removed remaining acid vapors and condensate to raise the pH of the extract subsequently derived by percolation in the column from a pH of about 4.7 to about pH 4.9.

The steam-treated, roasted coffee particles were subjected to aqueous extraction by the introduction of about 5400 gms. of an aqueous coffee extract produced by a plurality of previous separate extractions and having a solids content of approximately 26%. The steam flavor condensate obtained from the top of the column was immediately admixed with the non-aromatic aqueous extract and spray dried in a spray drier of conventional design to form a dry, free-flowing powder. This powder was found to be productive of a balanced flavor coffee beverage possessing desirable cup flavor when reconstituted with boiling water.

*Example II*

An elongated cylindrical glass fractionating column 3 inches in diameter and 4 feet long, and completely packed with half-inch Raschig glass rings, was inserted in the line in Example I between the percolator and the condenser and the mixed vapors issuing from the percolator column were conducted to the bottom of the fractionating column. Prior to the introduction of the mixed vapors, the fractionating column was cooled to about 55° F. by the passage of cold water through the column until the walls and contents of the fractionator reached the desired temperature. As the vaporous mixture was introduced and proceeded slowly upward in the packed column a condensate interface was observed to form on the surface of the glass rings immediately subadjacent to the bottom of the column. This condensate interface when first formed was observed to be light yellow green in color and slowly moved upward in the column. As the condensate interface moved upward in the column, it increased in amount and darkened in greenish hue. Simultaneously, immediately beneath the ascending greenish interface was noted a reflux activity and the appearance of a clear condensate liquid moving toward the bottom of the column.

The vapors coming out of the top of the fractionating column were condensed as in Example I. Approximately 1.2 ml. of volatiles per pound of coffee treated were condensed. These condensed vapors were found to contain substantially all of the active volatile flavor constituents free of excessive amounts of acid. The condensate recovered from the top of the fractional column was observed to have a pH of about 6 and a total acid content of about 1.6. The term "total acid content" as employed herein refers to the titratable acidity of the solution as measured by titration of the solution with a standardized sodium hydroxide solution. The condensate was oily in consistency and had a greenish brown color. The top fraction was composed substantially of aromatic coffee volatiles. The "tops" condensate had good stability when added to a non-volatile aqueous extract or powder and was miscible in either oil or an aqueous extract obtained from hot water extraction of roasted coffee. About 70 ml. of clear liquid accumulated at the bottom of the column and was drawn off. Upon analysis this liquid was observed to have a pH of about 2.5 and a total acid content of about 8.2. This "bottoms" fraction was in the liquid state and found to consist predominantly of water and organic acids chiefly acetic and caffeic acid.

The condensate was directly plated on or admixed with an extract of non-volatile coffee solids as in Example I. The ratio of volatile aromatic flavor "tops" to extract employed was from one part by weight of "tops" condensate to 99 parts by weight of non-volatile extract to 10 parts by weight of "tops" to 90 parts by weight of non-volatile extract. While these ratios broadly recite the relative proportions of isolated aroma liquid to base extract, the final criteria of the amount of volatile flavor to be admixed with a given quantity of base extract may be determined by the specific aroma level desired in the cup.

*Example III*

About 1400 pounds of green coffee were introduced into a roaster of the type conventionally employed in the coffee industry. The coffee was roasted for about 18 minutes to a terminal roast temperature of 415° F. to yield approximately 1250 pounds of roasted coffee beans which were then ground to a particle size range whereat 95% remained on a No. 20 U.S. Standard Sieve Mesh Screen and 5% remained on a No. 8 U.S. Standard Sieve Mesh Screen. Approximately 200 pounds of this ground coffee was then introduced to fill a stainless steel extraction column, 15 feet high, 10 inches inner diameter. Steam at between 1–10 p.s.i.g. was introduced at the bottom of the column and the steam pressure maintained at input within this range throughout the steam flavor volatilization cycle, which lasted approximately 30 minutes. During this cycle approximately 40 pounds of steam was supplied to the column. The volatile materials passed out of the top of the column and into a multi-tube vertical condenser. The condenser was cooled with brine at a temperature of 35°–50° F. The aromatic volatiles were collected at 40°–50° F. and at substantially normal atmospheric pressure.

As the steaming flavor volatilization proceeded, some slight amount of free watery liquid collected at the bottom of the column, usually less than 1% by weight of the roasted and ground coffee charge. Also, a gaseous, greenish ring of desired volatiles developed above the top of the roasted and ground coffee bed in 25 to 28 minutes. The constituents in this ring contained the essential or major fraction of use in flavoring coffee extract. These gaseous materials were eventually collected in the condenser.

The bed of roasted and ground coffee had an average moisture content at the end of the cycle of about 20% by weight of the total coffee. At the end of the cycle, the temperature in the region of the vapor products exiting from the top of the column was in the neighborhood of 215° F. During the flavor volatilization cycle, approximately 8 ml. of volatiles per pound of coffee treated was condensed.

Following the removal of the volatile constituents, the steam-treated, roasted coffee particles were subjected to aqueous extraction by the introduction of about 5400 grams of an aqueous coffee extract produced by a plurality of previous separate extractions and having a solids content of approximately 26%. The steam flavor condensate obtained from the top of the column was immediately admixed with the non-aromatic aqeous extract and spray dried in a spray drier of conventional design to form a dry, free-flowing powder. This powder was found to be productive of a balanced flavor coffee beverage possessing desirable cup flavor when reconstituted with boiling water.

*Example IV*

An elongated cylindrical glass fractionating column 4 inches in diameter and 7 feet long, and completely packed with half-inch glass Raschig rings was inserted in the line in Example III between the percolator and the condenser and the mixed vapors issuing from the percolator column were conducted to the bottom of the fractionating column. Prior to the introduction of the mixed vapors, the fractionating column was cooled to about 55° F. by the passage of cold water through the column until the walls and contents of the fractionator reached the desired temperature. As the vaporous mixture was introduced and proceeded slowly upward in the packed column a condensate interface was observed to form on the surface of the glass rings immediately subadjacent to the bottom of the column. This condensate interface when first formed was observed to be light yellow green in color and slowly moved upward in the column. As the condensate interface moved upward in the column, it increased in amount and darkened in greenish hue. Simultaneously, immediately beneath the ascending greenish interface was noted a reflux activity and the appearance of a clear condensate liquid moving toward the bottom of the column. Vapors started coming out of the top of the column after about 7 minutes' time.

The vapors coming out of the top of the fractionating column were condensed as in Example III. Approximately 1.4 ml. of volatiles per pound of coffee treated was condensed. These condensed vapors were found to contain substantially all of the active volatile flavor constituents free of excessive amounts of acid. The condensate recovered from the top of the fractional column was observed to have a pH of about 6 and a total acid content of about 1.6. The term "total acid content" as employed herein refers to the titratable acidity of the solution as measured by titration of the solution with a standardized sodium hydroxide solution. The condensate was oily in consistency and had a greenish brown color. The top fraction was composed substantially of aromatic coffee volatiles. The "tops" condensate had good stability when added to a non-volatile extract or powder and was miscible in either oil or an aqueous extract obtained from hot water extraction of roasted coffee.

The condensate was directly plated on or admixed with an extract of non-volatile coffee solids as in Example III. The ratio of volatile aromatic flavor "tops" to extract employed was from one part by weight of "tops" condensate to 99 parts by weight of non-volatile extract to 10 parts by weight of "tops" to 90 parts by weight of non-volatile extract. While these ratios broadly recite the relative proportions of isolated aroma liquid to base extract, the final criteria of the amount of volatile flavor to be admixed with a given quantity of base extract may be determined by the specific aroma level desired in the cup.

Although the examples presented to illustrate several embodiments of the invention are directed toward a single or batch type process, the scope of the invention also comprehends a continuous fractionation and/or condensation of the aroma. Particularly where a continuous steam operation is involved the continuous fractionation and condensation of the steam volatile flavor has proven to be desirable. This continuous fractionation operation would involve a continuous reflux system which is induced by an external condenser.

This application is a continuation-in-part of applications Serial No. 787,331, filed January 19, 1959, now abandoned; Serial No. 189,312 filed April 23, 1962 now abandoned; Serial No. 807,010 filed April 17, 1959, now abandoned; Serial No. 166,676 filed January 16, 1962; and Serial No. 111,187 filed May 19, 1961.

While the present invention has been described with particular reference to specific examples, it is not to be limited thereby, but reference is to be had to the appended claims for the definition of its scope.

What is claimed is:

1. The method of producing a soluble coffee product comprising introducing steam at the lower extremity of an elongated column containing a packed bed of roasted and ground coffee particles having a particle size whereat at least 90% by weight of the particles are retained on a 40 mesh U.S. Standard Sieve Screen, said bed having a length of at least five times its width and a void space between said coffee particles sufficient to permit an internal refluxing and rectification of steam distilled volatile coffee constituents along the tortuous paths between said particles whereby said steam condenses on and wets the coffee particles and generates and extracts said volatile coffee constituents therefrom, continuing the supply of steam to said bed to initiate and maintain said refluxing and rectification condition until all of the coffee particles have been wetted by steam and the reflux and rectification interface has reached the top of the bed of coffee particles and a quantity of co-distilled volatile organic acids have been thereby separated from the desired volatile constituents, condensing said desired volatile constituents, thereafter extracting and removing water soluble solids from said coffee particles, and combining said condensed volatile constituents and the extract containing said water soluble solids to produce a highly flavorful water soluble coffee product.

2. A method according to claim 1 wherein the coffee particles have a particle size whereat at least 90% by weight of the particles are retained on a 20 mesh screen.

3. A method according to claim 2 wherein the roasted and ground coffee particles have their moisture content increased during said refluxing and rectification to a moisture content ranging between 15-25% and the coffee particles have a temperature at the end of said steam distillation of at least 180° F.

4. A method according to claim 2 wherein the extract is dried to a powder and the condensed volatile coffee constituents are plated thereon.

5. A method according to claim 3 wherein the packed elongated steaming column is from 5 to 20 times in its length dimension what it measures in its width and said bed of coffee particles have a temperature less than 80° F. prior to introduction of steam thereto.

6. A method according to claim 4 wherein said volatiles are condensed at temperatures of 35°–70° F.

7. A method according to claim 4 wherein said volatile coffee constituents and water extract of coffee are combined and dried to produce a soluble coffee powder.

8. A method according to claim 1 wherein the steam distilled volatile coffee constituents are further separated from volatile organic acids and water by passing said volatile coffee constituents through an elongated packed fractionator column having a top and a bottom, removing condensed volatile organic acids and water from the bottom of said fractionator column, removing said volatile coffee constituents from the top of said fractionator column, and condensing said volatile coffee constituents.

9. A method according to claim 8 wherein the elongated packed fractionator column is at least 5 times greater in length than in cross-section.

10. The method of producing a soluble coffee product comprising introducing saturated steam at the bottom of an elongated extraction column containing a packed bed of freshly roasted and ground coffee particles having a particle size whereat at least 90% by weight of the particles are retained on a 20 mesh screen, said bed having a length 5 to 20 times what it measures in width and a void space between said coffee particles sufficient to permit an internal refluxing and rectification of steam distilled volatile coffee constituents along the tortuous paths between said particles whereby said steam condenses on and wets the coffee particles and generates and extracts said volatile coffee constituents therefrom, continuing the supply of steam to said bed to initiate and maintain said refluxing and rectification condition until all of the coffee particles in the bed have been wetted by steam and the reflux and rectification interface has reached the top of the bed of coffee particles and a quantity of co-distilled volatile organic acids have been thereby separated from the desired volatile constituents, the roasted and ground coffee particles throughout the depth of the bed being elevated to a temperature above 190° F. and below 230° F., and increasing in moisture from 3–7% to 15–25%, the temperature in the region of the vapor product exiting from the bed being 212°–230° F., collecting at least that portion of the desired volatile constituents which condenses at a temperature of 35°–70° F. under substantially normal atmospheric pressure, thereafter introducing previously percolated coffee extract to said bed to remove water-soluble constituents from the coffee particles therein and produce a water extract of 25–65% water soluble solids concentration, admixing said volatile coffee constituents in said water extract of coffee particles, and drying the extract to produce a soluble coffee product.

11. A method according to claim 10 wherein the steam is passed through said bed of roasted and ground coffee for a period of at least 15 minutes, said steam treatment being continued until 1–8 ml. of liquid condensate per pound of coffee treated is collected.

12. A method according to claim 10 wherein the steam is passed through said bed of roasted and ground coffee for a period of at least 20–30 minutes, said steam treatment being continued until 1–6 ml. of liquid condensate per pound of coffee treated is collected.

13. A method according to claim 10 wherein the steam distilled volatile coffee constituents are further separated from volatile organic acids and water by passing said volatile coffee constituents through an elongated packed fractionator column having a top and a bottom, removing condensed volatile organic acids and water from the bottom of said fractionator column, removing said volatile coffee constituents from the top of said fractionator column, and condensing said volatile coffee constituents.

14. A method according to claim 13 wherein the elongated packed fractionator column is at least 5 times greater in length than in cross-section.

15. A method according to claim 13 wherein the elongated packed fractionator column employed has a length 5 to 20 times its cross-sectional area.

16. A method according to claim 15 wherein the steam is passed through said bed of roasted and ground coffee for a period of at least 15 minutes, said steam treatment being continued until 1–8 ml. of liquid condensate per pound of coffee treated is collected.

17. A method according to claim 15 wherein the steam is passed through said bed of roasted and ground coffee for a period of at least 20–30 minutes, said steam treatment being continued until 1–6 ml. of liquid condensate per pound of coffee treated is collected.

References Cited in the file of this patent

UNITED STATES PATENTS

| | | |
|---|---|---|
| 1,123,828 | Whitaker et al. | Jan. 5, 1915 |
| 2,155,971 | Houseman | Apr. 25, 1939 |
| 2,432,759 | Heyman | Dec. 16, 1947 |
| 2,562,206 | Nutting | July 31, 1951 |
| 2,680,687 | Lammonier | June 8, 1954 |
| 2,853,387 | Nutting | Sept. 23, 1958 |